United States Patent Office 2,693,840
Patented Nov. 9, 1954

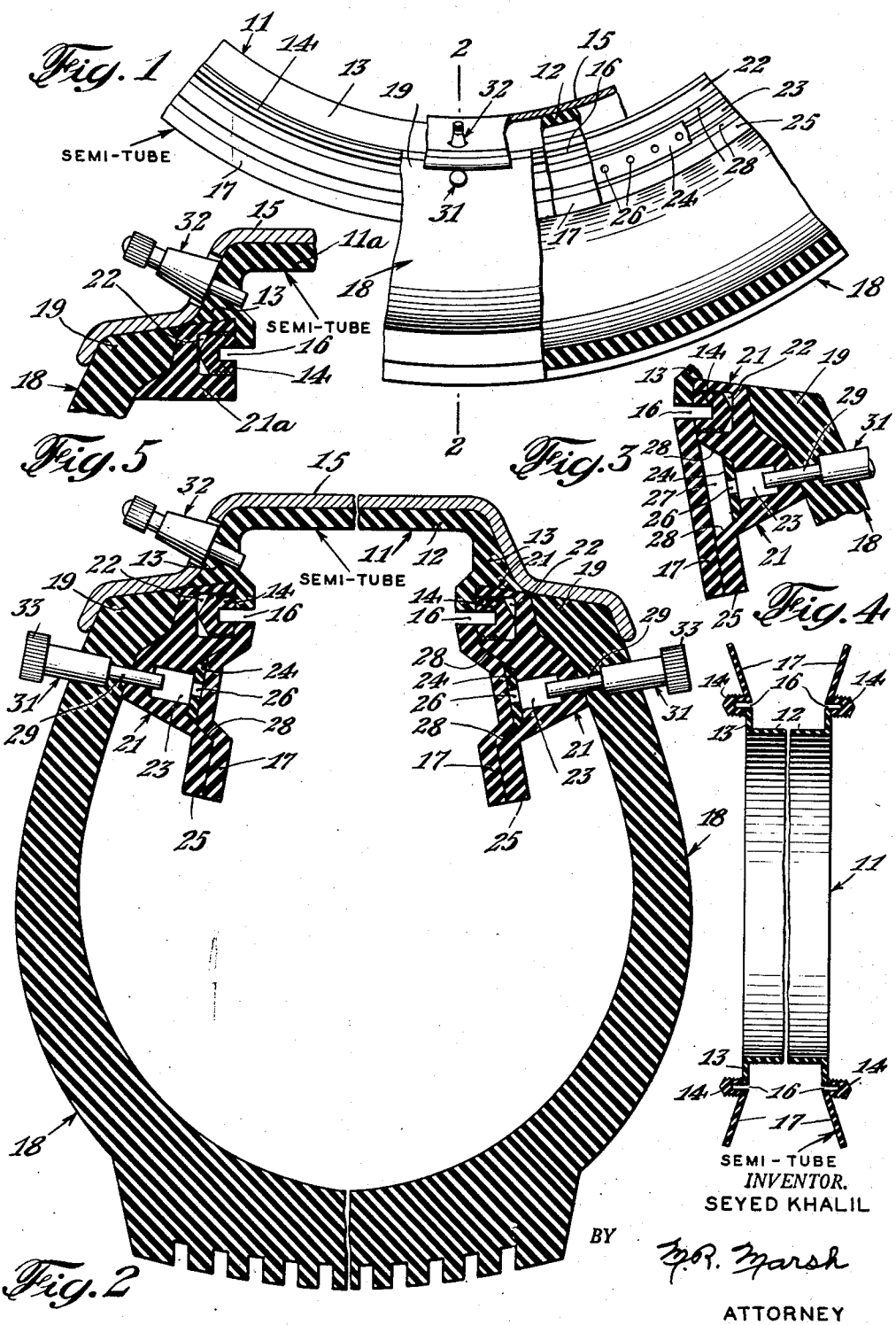

2,693,840

SEMITUBE TIRE

Seyed Khalil, New York, N. Y.

Application July 28, 1950, Serial No. 176,419

17 Claims. (Cl. 152—363)

This invention relates primarily to pneumatic vehicle tires, and is more particularly directed toward what is hereinafter termed a semi-tubed tire.

The semi-tubed tire of the present invention comprises the combination of a tire casing having a conventional outward appearance and spaced apart rim engaging beads, and a bridging or sealing member, hereinafter referred to as a semi-tube, adapted to airtightly span the gap between the beads of said casing, and to be secured thereto either by the pressure of air admitted to the tire, or by vacuum produced in the beads of the casing, or by an adhesive, such as glue, or by a combination of said securing means. The present invention is an improvement in and a continuation-in-part of my co-pending application filed May 2, 1950, bearing Serial No. 159,455, now Patent No. 2,680,465 and entitled "Pneumatic Vehicle Tire."

This invention has for one of the principal objects thereof the provision of a semi-tube having a central rim engaging section on each side of which are two concentric annular independently expansible sections, with the latter sections being separated from the central section by ribs or rings of non-expansible reinforcing material. The semi-tube co-operates with annular extensions vulcanized or otherwise secured to the inner surfaces of the beads of the casing which have formed therein grooves adapted to co-operate, as will be hereinafter described, with the outer sections of said semi-tube, whereby the same is forced or bulged therein by the action of vacuum on one side or by the pressure of air admitted to the tire to inflate the same on the other side, or both, to produce an airtight seal between the co-operating surfaces of the tire casing extensions and the semi-tube.

Still another object of this invention is to provide means for eliminating the air in the grooves in the bead extensions when the expansible sections of the semi-tube are bulged into the same.

Another object of this invention is to provide a semi-tubed tire having vulcanized or otherwise secured to the inner face of each bead of the casing an annular unit or extension with a substantially U-shaped cross-section pneumatic groove in the face thereof divided into an inner and an outer compartment by means of a perforated ring-like element. The sides of each outer compartment slope inwardly toward the perforated ring-like element and provide an annular cavity into which the outer section of the semi-tube is bulged by the action of vacuum on one side, or by the pressure of air admitted to the tire to inflate the same on the other side, or both, thus producing an airtight seal between the co-operating surfaces of the tire casing and the semi-tube.

Still another object of the invention is to provide in each of the tire casing beads an annular pneumatic groove having inner and outer compartments so arranged that the semi-tube expands or bulges into the outer compartment by vacuum established in the inner compartment and/or by the air subsequently admitted to the tire casing after mounting on a rim.

Another object of this invention is to provide a sectional semi-tube having two annular concentric independently expansible sections which co-operate with and are pneumatically sealed against the beads, with the expansible sections separated by an inner section adapted to engage the rim on which the casing is mounted.

Another object of this invention is to provide a semi-tube having annular reinforcing rings with projections adapted to co-operate with notches in the beads of the tire casing or extensions thereof to assist in mounting and centrally locating and holding the semi-tube in the tire casing.

Still another object of this invention is to provide a valve means which may be used for establishing a vacuum in the various compartments of said pneumatic grooves in the beads of the casing or extension thereof, and/or for permitting escape of air in said grooves when the semi-tube is bulged therein by pressure of the air in the tire.

General description

In my above-mentioned co-pending application, filed May 2, 1950, Serial No. 159,455, I have illustrated a semi-tube which is held in position by means of vacuum established in vacuum chambers formed in the tire casing through vacuum producing valves.

The present invention differs from my said former co-pending application in that the semi-tube of the present invention may be installed in its co-operating casing either with or without the use of a vacuum pump.

The assembling and correct positioning of the semi-tube in the casing of the present invention is accomplished primarily by means of ribs or rings provided on the semi-tube and which co-operate with notches formed in the beads of the casing.

If a vacuum pump is employed during the assembling of the units of the present invention, it evacuates air from the so-called pneumatic groove corresponding in some respects to the vacuum chambers of the co-pending application. The pneumatic grooves are formed in the beads of the casing or extensions thereof adjacent to the said notches, and each communicates with a vacuum producing valve in the beads.

When a vacuum pump is unavailable, the semi-tube is to be sealed to the casing by the pressure of air admitted to the tire after being mounted on its rim. In this case the vacuum producing valves are used to permit the escape of air from the pneumatic grooves by removing the cores therefrom. When the tire is completely inflated, the caps of said vacuum producing valves are replaced. Thus the semi-tube is sealed on the casing not only by pressure of the air in the tire but also by a suction produced by a bulging of the semi-tube into the outer pneumatic groove.

The drawings

Fig. 1 is a fragmentary side detail view of a section of the tire casing and semi-tube constructed in accordance with the principles of the present invention, together with sections of a mounting rim, with various sections and parts being broken away to more clearly show the construction;

Fig. 2 is a transverse sectional view of the complete semi-tubed tire, as the latter appears when the tire is mounted on a rim and inflated;

Fig. 3 is a detailed sectional view of a part of the semi-tube and tire casing bead extensions as the semi-tube appears when it is mounted in the casing and before it is pneumatically sealed to said casing;

Fig. 4 is a sectional view of the semi-tube; and

Fig. 5 is a fragmentary detailed sectional view of a modification of the invention.

The semi-tube

The semi-tube of the present invention is indicated generally by reference numeral 11 and, as shown in Fig. 4, it is made up primarily of sheet material, and in this and other respects hereinafter pointed out differs from the conventional inner tube which has a closed circular air receiving tube. The semi-tube 11 of the present invention is preformed for the purposes hereinafter apparent and pointed out, and has a central ring-like section 12, with radially extending flanges 13. The sections 12 and 13 of the semi-tube are of the same material which may be similar to the material employed in conventional type inner tubes. This material is somewhat expansible and airtight, and the ring-like section 12 and part of the flanges 13 contact the rim of the wheel upon which the tire is mounted.

To the ends of the flanges 13 of the semi-tube are secured, as by vulcanizing, circular ribs or rings 14, one at each side of the semi-tube. The rings 14 are of rubber or rubberlike material and have little ridges on the sides thereof for purposes hereinafter pointed out. The ribs 14 have openings or slots 16 formed therein from the inner side of the semi-tube and to the outside edges of the ribs are attached, as by vulcanizing, the circular expansible outer sections 17 of the semi-tube. The sections 17, as stated, are of expansible material and in the natural state of the semi-tube these sections normally tend to flare outwardly from each other in the manner illustrated in Fig. 4. The sections 17, while being expansible and somewhat flexible, retain their outward flaring position when not acted upon by other forces. Thus, from the preceding description it can be seen that the semi-tube includes three annular sections of sheet material, a central inner section and two adjoining side outer sections. In the preferred form of my invention the inner section of the semi-tube is adapted to have greater resistance to mechanical wear, abrasion, etc., than the outer sections of said semi-tube. The manner in which the semi-tube is mounted in the tire casing and the manner in which the various parts thereof function to effectively bridge and seal the gap between the beads of the tire casing will be pointed out hereinafter.

*The tire casing*

The tire casing included in the present invention is indicated in general by reference numeral 18 and has the same general outward appearance as tire casings in present day use. The beads 19 of the tire casing may also be constructed in the conventional manner, and in accordance with the invention there is secured to the inside opposite faces of these beads, as by vulcanizing, a pair of bead extensions, referred to generally by reference numeral 21. The bead extensions may be, if desired, formed on the tire casing during the construction of the casing or, as shown, by separate sections subsequently vulcanized thereto.

As best shown in Figs. 2 and 3, the bead extension 21 near the upper end thereof has a notch 22 somewhat similar in size to the ribs or rings 14 on the semi-tube, which is adapted to receive the same when the semi-tube is inserted in the tire casing. The bead extension 21 also has a circular U-shaped groove 23 therein which forms what is hereinafter termed the inner pneumatic compartment. Over the face of the groove 23 is placed a ring-like element 24. The element 24 has a series of perforated holes 26 therein and rests upon shoulders at the end of the groove 23, and thereby separates the inner pneumatic compartment 23 from the outer pneumatic compartment 27. The latter is formed by one surface of the expansible section 17 of the semi-tube, the outer surface of the ring-like element 24, and the sloping sides 28 of the bead extension 21.

Each inner pneumatic compartment 23 has associated therewith a tube 29 which communicates with valves, indicated generally by reference numeral 31. The valves 31 are similar in construction to the vacuum valves shown in detail in my above-identified co-pending application, and have valve cores which permit the establishment of vacuums in the pneumatic compartments 23 when a vacuum pump is applied to the valves 31.

*Assembling semi-tube and tire casing*

When the semi-tube is to be assembled, it is first moistened by a suitable liquid, such as for example, soapy water, to enable the semi-tube to make a more efficient contact with the bead extensions 21. Then the semi-tube is loosely placed in the tire casing and the compressible ribs or rings 14 thereof are manually forced into the notches 22 of the bead extensions on both of the tire beads and, due to the notches or grooves in the surfaces of the ribs 14 which engage the sides of the U-shaped notches 22, the semi-tube is held in place and one side will not drop away from the bead extension when the tire is lying flat and while the unit is being mounted on a rim 15. Due to the tendency of the expansible sections 17 of the semi-tube to normally flare outwardly, the outer portions of said sections 17 mesh closely with the free ends 25 of the extensions 21, as shown in Fig. 3. Thus there is a reasonably tight seal between the expansible sections 17 and the ends 25 of the bead extensions which will prevent the initial escape of air from the tire which air may subsequently be admitted thereto through a valve, indicated generally by reference numeral 32.

If a vacuum pump is available when assembling the tire and semi-tube, it is connected to the valve 31 normally before air is admitted through valve 32 to establish vacuum in the inner and outer pneumatic compartments 23 and 27, respectively. Due to its expansibility, the section 17 of the semi-tube will expand or bulge into the outer pneumatic compartment 27 and press against the ring-like element 24, and as long as vacuum is maintained in the inner pneumatic compartment, the semi-tube will be held against this element.

When no vacuum pump is available, the tire is mounted on the rim and the cores of the valves 31 are removed normally before air is admitted through the valve 32, and as the latter occurs, no back pressure will be established in said compartment while building up air pressure within the tire casing and the semi-tube. The air pressure will force the expansible sections 17 of the semi-tube to bulge into the outer pneumatic compartments 27 to a position such as that shown in Fig. 2. The subsequent replacement of the valve cores of valves 31 and/or the installation of the caps 33 thereon causes the semi-tube extensions 17 to be held in place by the partial vacuum established in the compartments 23 as the heretofore curved sections 17 tend to straighten out even though the air pressure within the tire is reduced to atmospheric pressure.

Thus, in accordance with the principles of the present invention, there is provided an arrangement for sealing a semi-tube to the beads or bead extensions of a tire casing with or without a vacuum, and the semi-tube is held in place by the pressure of the air within the tire as well as by suction created in said pneumatic compartments.

*Modified form*

In the modified form of the invention as shown in Fig. 5, similar parts are indicated by similar reference numerals, and modified parts by the addition of the letter *a*. In Fig. 5 the casing 18 has secured to its bead 19 an extension 21*a* somewhat smaller than the extension 21 of Figs. 2 and 3. The extension 21*a* has a notch 22 in the exposed open face thereof adapted to receive the rib or ring 14 secured to the radial extension 13 of the semi-tube 11*a*. The semi-tube and casing are assembled by manually forcing the ribs 14 into the notches and after mounting on a rim 15 air is admitted through the valve 32. As the air enters the tire, the pressure established is effective in the slot 16 of the rib 14 to expand the same and wedge it airtightly in the notch, thereby airtightly sealing the gap between the beads 19.

While the invention has been shown and described in but a single embodiment and one modification thereof, it will be obvious that various other modifications may be made therein without departing from the spirit or essential attributes thereof, such as for example, sealing a semi-tube to the beads of a casing by gluing, and it is desired, therefore, that only such limitations be placed on the invention as are specifically imposed by the appended claims.

What I claim as my invention is:

1. In a pneumatic vehicle tire, a casing having enlarged spaced apart beads, a pair of radially spaced annular concentric axially open-faced grooves in the inner surfaces of the enlarged portion of each of said beads, a semi-tube having a portion overlapping the open face of one groove in each bead and a portion to span the gap between said beads, valve means to inflate the tire, annular concentric ribs on each side of said semi-tube between the portions thereof which overlap said grooves and the portion which spans the gap between the beads of the casing engageable with the other of said grooves and retained therein by air pressure when said tire is inflated, and means to subject said overlapped grooves to a fluid pressure less than that of said air pressure.

2. In a pneumatic vehicle tire, a casing having enlarged spaced apart beads, a first and a second set of annular concentric open-faced grooves in the opposite faces of the enlarged portion of said beads, a semi-tube having a portion overlapping the open faces of one set of said grooves and a portion to span the gap between said beads, means to subject said last mentioned set of overlapped grooves to a predetermined low pressure, valve means to inflate the tire to a pressure higher than said first said pressure, and annular concentric ribs on each side of said semi-tube between the portions thereof which overlap said grooves and the portion which spans the gap between the beads of the casing, to engage the other set of said grooves, and to be maintained in such engagement by the inflating pressure, said ribs dividing said semi-tube into three concentric sections, a central and two outer sections, with each of said sections being independently expansible.

3. In a pneumatic tire, a semi-tube of sheet material having two sealing sections at the edges thereof, a casing having two spaced-apart rim engaging beads, each of said beads having on the inner face thereof an inwardly projecting extension, a groove in each of said extensions for co-operating with said semi-tube sealing sections, each of said grooves being divided into at least two intercommunicating compartments, one of said compartments housing a part of a sealing section of said semi-tube, and another of said compartments providing a vacuum source to control the housing of said semi-tube in said first-named compartment.

4. In a pneumatic tire, a semi-tube having two outer sealing edges, a casing having two spaced-apart rim engaging beads, a groove in the inner opposite faces of each of said beads holding the edges of said semi-tube, said grooves having a somewhat U-shaped cross-section at their greatest depth and inwardly sloping sides at the outer ends thereof with shoulders at the intersection of said sloping sides and the U-shaped sections, and a ring-like perforated element adapted to rest on said shoulders and divide each of said grooves into inner and outer compartments, said outer compartments housing air-tightly the outer sealing edges of said semi-tube when the latter is forced therein by pressure of air admitted to the tire.

5. In a pneumatic tire, a casing having spaced-apart rim engaging beads, open-faced grooves formed in the inner opposite surfaces of said beads, air evacuating valves for said grooves, a sectional semi-tube including two outer annular concentric sealing sections separated by a central annular section, the outer sections of said semi-tube having the major portions thereof flat and overlapping the open faces of said grooves and the central section spanning the gap between said beads to contact and to conform to the rim upon which the tire is mounted, and valve means for communicating with the interior of said tire to admit air thereto for expanding the outer and central sections of said semi-tube to intimately contact the open faces of said grooves and said rim respectively, each of said sections being independently expansible.

6. In a pneumatic tire, a casing, an annular semi-tube of sheet material having two annular flexible side sections, an annular axial rib having substantially parallel side surfaces on each of said side sections, said surfaces each being disposed on an annular plane lying within the confines of said casing, said casing including two spaced-apart rim engaging beads, and an axial notch formed in each of said beads to receive and engagingly hold by frictional engagement the side surfaces of said ribs thereby enabling said semi-tube to be centrally located and held in said casing.

7. In a pneumatic tire, a casing having spaced-apart rim engaging beads with projections extending into the tubular part of the tire, annular grooves formed in the projections of said beads, a co-operating expansible semi-tube of sheet-like material having outer annular sections overlapping said grooves and an inner section for spanning the space between said beads, non-expansible annular rings at the adjacent edges of said semi-tube sections separating the expansible outer sections of said semi-tube from the expansible inner section thereof and allowing them to expand independently when said tire is inflated.

8. In combination in a pneumatic tire, a rim, a semi-tube of sheet-like material including an inner annular section and a pair of outer annular sections, a pair of annular mounting ribs between the adjacent sections of said semi-tube, a co-operating casing having spaced apart and enlarged rim engaging beads, mounting grooves and open faced grooves formed in said beads, said first grooves housing said ribs and holding said semi-tube against said casing to close the opening between the casing beads, an air valve on said semi-tube admitting air to said tire, said air causing the inner section of said semi-tube to tightly contact and press against the portion of the rim between the casing beads, and said air also causing the outer sections of said semi-tube to bulge into said open faced grooves and thereby enable said outer sections to be intimately sealed against at least a portion of said open faced grooves.

9. In combination in a pneumatic tire, a rim, a semi-tube of sheet-like material including an inner annular section and a pair of outer annular sections, a pair of annular mounting ribs between the adjacent sections of said semi-tube, a co-operating casing having spaced apart and enlarged rim engaging beads, mounting grooves and open faced grooves formed in said beads, said first grooves housing said ribs and holding said semi-tube against said casing to close the opening between the casing beads, an air valve on said semi-tube admitting air to said tire, said air causing the inner section of said semi-tube to tightly contact and press against the portion of the rim between the casing beads, said air also causing the outer sections of said semi-tube to bulge into said open faced grooves and thereby enable said outer sections to be intimately sealed against at least a portion of said open faced grooves, air valves on said casing communicating with said open faced grooves, and means including said last-named valves to permit the escape of air from said open faced grooves while air is being admitted in the tire through said air admitting valve.

10. In combination in a pneumatic tire, a rim, a semi-tube of sheet-like material including an inner annular section and a pair of outer annular sections joined to form a unitary structure, a pair of annular mounting ribs between and formed integral with the adjacent sections of said semi-tube, a co-operating casing having spaced apart and enlarged rim engaging beads, mounting grooves and open faced grooves formed in said beads, said first grooves housing said ribs and holding said semi-tube against said casing to close the opening between the casing beads, an air valve on said semi-tube admitting air to said tire, said air causing the inner section of said semi-tube to tightly contact and press against the portion of the rim between the casing beads, said air also causing the outer sections of said semi-tube to bulge into said open faced grooves and thereby enable said outer sections to be intimately sealed against at least a portion of said open faced grooves, and air evacuating valves on said casing for evacuating air from said open faced grooves by means of a pump so as to draw said bulge into said open faced grooves by vacuum produced in said open faced grooves.

11. In a pneumatic tire, a casing having two spaced apart rim engaging beads, an expansible semi-tube including two annular side sections and an annular central section with each side section being joined to said central section at the edges thereof, a circular rib at each of the joined edges of said semi-tube sections, each of said ribs being somewhat rectangular in cross section and annular grooves of somewhat rectangular cross section formed in the beads of said casing to cooperate with said circular ribs and centrally position said semi-tube during and after mounting the tire on a tire rim, said ribs having formed thereon parallel annular ridges to frictionally engage the walls of said grooves.

12. In a pneumatic semi-tube tire, a casing having spaced apart rim engaging beads each containing an axial opening, a semi-tube to cover a portion of said casing and to span the space between the beads thereof, and a hollow rib extending axially from said semi-tube to enter one of said axial openings to hold said semi-tube against said portion of the casing prior to the admission of air therein.

13. In a semi-tube tire, a tire casing having a pair of annular spaced apart rim engaging beads, said beads having annular axial grooves formed on the inner surfaces thereof, an annular semi-tube of sheet material for the space between said beads, said semi-tube having edge surfaces each carrying an annular hollow axially outwardly expandable rib for insertion in said grooves with the hollow thereof facing the interior of said casing, and a valve in said semi-tube for admitting air to said tire, whereby the air admitted to said tire and entering said hollow ribs expands said ribs in said grooves and air-tightly seals the semi-tube thereto and to the opening between the beads of said casing.

14. In a semi-tube tire, a tire casing having a pair of annular spaced apart rim engaging beads, said beads having annular notches formed on the inner opposite faces thereof, an annular semi-tube of sheet material spanning the space between said beads, said semi-tube having adjacent each of the edge surfaces thereof an annular rib for insertion in said notches, said ribs each having an annular opening therein on the inner face of said semi-tube, and an air valve admitting air to said tire, whereby air admitted to said tire enters into the openings in said ribs to expand the same in said notches causing said semi-tube to airtightly seal the gap between the beads of said casing.

15. In a pneumatic tire, an annular expansible semi-tube having a U-shaped cross-section, and at least two annular expansible ribs facing away from each other having a U-shaped cross-section with one leg of each of said ribs angularly secured to one of the legs of said semi-tube, a casing having enlarged spaced apart rim engaging beads, with at least one annular groove having a U-shaped cross-section in each of said beads in alignment with each other, the open side of said grooves facing each other, said grooves being adapted to receive and house said ribs, and valve means to inflate said tire.

16. In a pneumatic tire, an annular expansible semi-tube having a U-shaped cross-section, and at least two annular expansible ribs having a U-shaped cross-section with one leg of each of said ribs angularly secured to and extending axially beyond one of the legs of said semi-tube, a casing having enlarged spaced apart rim engaging beads, with at least one annular groove of U-shaped cross-section in each of said beads, the open side of each of said grooves facing each other, said grooves receiving and housing said ribs, valve means to inflate said tire, whereby the pressure established by said air subsequently admitted to said tire expands said ribs airtightly against the walls of said grooves.

17. In a pneumatic tire, a casing member having two spaced apart rim engaging beads each containing a circular axial groove, a semi-tube member formed of sheet material and including two annular side sections and an annular central section, each side section being joined to said central section along the edges thereof, an annular axial rib adjacent to each of said joined edges of said semi-tube sections, said ribs facing away from each other, and said ribs engaging with said circular grooves to hold said semi-tube in position in said casing member during and after mounting the tire on a rim, and means to admit air into said tire for forcing said annular side sections and said annular ribs into fluid tight relation with the beads and the circular grooves of said casing.

References Cited in the file of this patent

UNITED STATES PATENTS

| Number | Name | Date |
|---|---|---|
| 559,873 | Sweetland | May 12, 1896 |
| 800,308 | De Laski et al. | Sept. 26, 1905 |
| 1,295,604 | Roberts | Feb. 25, 1919 |
| 1,302,447 | Stark et al. | Apr. 29, 1919 |
| 1,653,054 | Mack | Dec. 20, 1927 |
| 1,785,691 | Burdette | Dec. 16, 1930 |

FOREIGN PATENTS

| Number | Country | Date |
|---|---|---|
| 10,272 | Great Britain | A. D. 1898 |